US011120398B2

(12) United States Patent
Deane et al.

(10) Patent No.: US 11,120,398 B2
(45) Date of Patent: Sep. 14, 2021

(54) SYSTEMS AND METHODS FOR IMPROVING PACKAGING AND DELIVERY OF PRODUCTS IN ASSOCIATION WITH TRAVEL

(71) Applicant: L'Oreal, Paris (FR)

(72) Inventors: Geoffrey Deane, Redmond, WA (US); Zane Bowman Allen Miller, Seattle, WA (US); Roy P. Diaz, Redmond, WA (US)

(73) Assignee: L'Oreal, Paris (FR)

( * ) Notice: Subject to any disclaimer, the term of this patent is extended or adjusted under 35 U.S.C. 154(b) by 335 days.

(21) Appl. No.: 15/994,775

(22) Filed: May 31, 2018

(65) Prior Publication Data
US 2019/0370733 A1  Dec. 5, 2019

(51) Int. Cl.
*G01N 35/00* (2006.01)
*G06Q 10/08* (2012.01)
*G06Q 10/02* (2012.01)

(52) U.S. Cl.
CPC .......... *G06Q 10/087* (2013.01); *G06Q 10/02* (2013.01)

(58) Field of Classification Search
USPC ............... 222/256, 340; 340/573.1; 118/305; 705/1.1, 7.11, 7.12
See application file for complete search history.

(56) References Cited

U.S. PATENT DOCUMENTS

| | | | |
|---|---|---|---|
| 2003/0014324 A1 | 1/2003 | Donovan et al. | |
| 2010/0158961 A1* | 6/2010 | Gunn | A61K 8/342 424/401 |
| 2014/0067438 A1* | 3/2014 | Pesch | G06Q 30/0233 705/5 |
| 2015/0046298 A1* | 2/2015 | Zwakhals | G06Q 10/087 705/28 |
| 2016/0132950 A1 | 5/2016 | Fleming et al. | |
| 2017/0301002 A1* | 10/2017 | Wilkinson | G06Q 30/0631 |
| 2017/0349425 A1* | 12/2017 | Kline | B67D 1/0888 |
| 2019/0174284 A1* | 6/2019 | Gold | G06Q 30/02 |

OTHER PUBLICATIONS

International Search Report and Written Opinion dated Aug. 8, 2019, issued in corresponding International Application No. PCT/US2019/034312, filed May 29, 2019, 13 pages.

\* cited by examiner

*Primary Examiner* — Akiba K Robinson
(74) *Attorney, Agent, or Firm* — Christensen O'Connor Johnson Kindness PLLC (57) ABSTRACT

In some embodiments, the present disclosure provides a travel product system. The travel product system determines user product preferences for personal care products that the user may wish to use at a travel destination. In an embodiment, the system comprises a system for processing personal care products for use during travel. The travel product system may obtain these preferences directly from the user, or may automatically obtain the preferences from other sources. The travel product system may cause appropriate amounts of the products to be packaged and delivered to the user's travel destination, thus reducing waste and making the products available at the destination without having to carry them while in transit.

17 Claims, 4 Drawing Sheets

SYSTEMS AND METHODS FOR IMPROVING PACKAGING AND DELIVERY OF PRODUCTS IN ASSOCIATION WITH TRAVEL

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for packaging and delivering liquid personal care products for use during travel is provided. The system comprises a product fulfillment system, a mobile computing device, a personal care product system, a travel processing system, and a customized product system. The product fulfillment system comprises a packaging device configured to fill containers with configurable amounts of liquid personal care products. The mobile computing device is configured to present a first user interface for providing personal care product preference selections; and a second user interface for booking travel. The personal care product system comprises one or more computing devices configured to receive personal care product preference selections from the mobile computing device. The travel processing system comprises one or more computing devices configured to receive and process travel information from the mobile computing device. The customized product system comprises one or more computing devices configured to receive travel information from the travel processing system; receive personal care product preference selections from the personal care product system; determine at least one personal care product to be packaged based at least on the personal care product preference selections; determine appropriate amounts of the at least one personal care product based on the travel information; and transmit an instruction to the product fulfillment system to fill at least one container with the appropriate amounts of the at least one personal care product.

In some embodiments, a computing device is provided. The computing device comprises circuitry for receiving travel information from a travel processing system; circuitry for receiving product preference selections; circuitry for determining at least one product to be packaged based at least on the product preference selections; circuitry for determining appropriate amounts of the at least one product based on the travel information; and circuitry for transmitting an instruction to a product fulfillment system to fill at least one container with the appropriate amounts of the at least one product. In some embodiments, a computer-implemented method is provided. A computing device of a customized product system receives travel information from a travel processing system. The computing device receives product preference selections. The computing device determines at least one product to be packaged based at least on the product preference selections. The computing device determines appropriate amounts of the at least one product based on the travel information. The computing device transmits an instruction to a product fulfillment system to fill at least one container with the appropriate amounts of the at least one product.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Many people travel for both work and leisure. Packing personal care supplies is easily one of the most difficult parts of traveling today. Airport security strictly enforces size limits for both overall carry-on baggage sizes, and also for small containers of liquids. If liquid bottles do not comply with the requirements being applied at a particular security screening checkpoint, the bottles may be thrown away. This problem is made particularly difficult with respect to personal care products, because many personal care products are packaged for consumption over a long period of time, and are therefore much larger than one needs while traveling.

Figure 1:
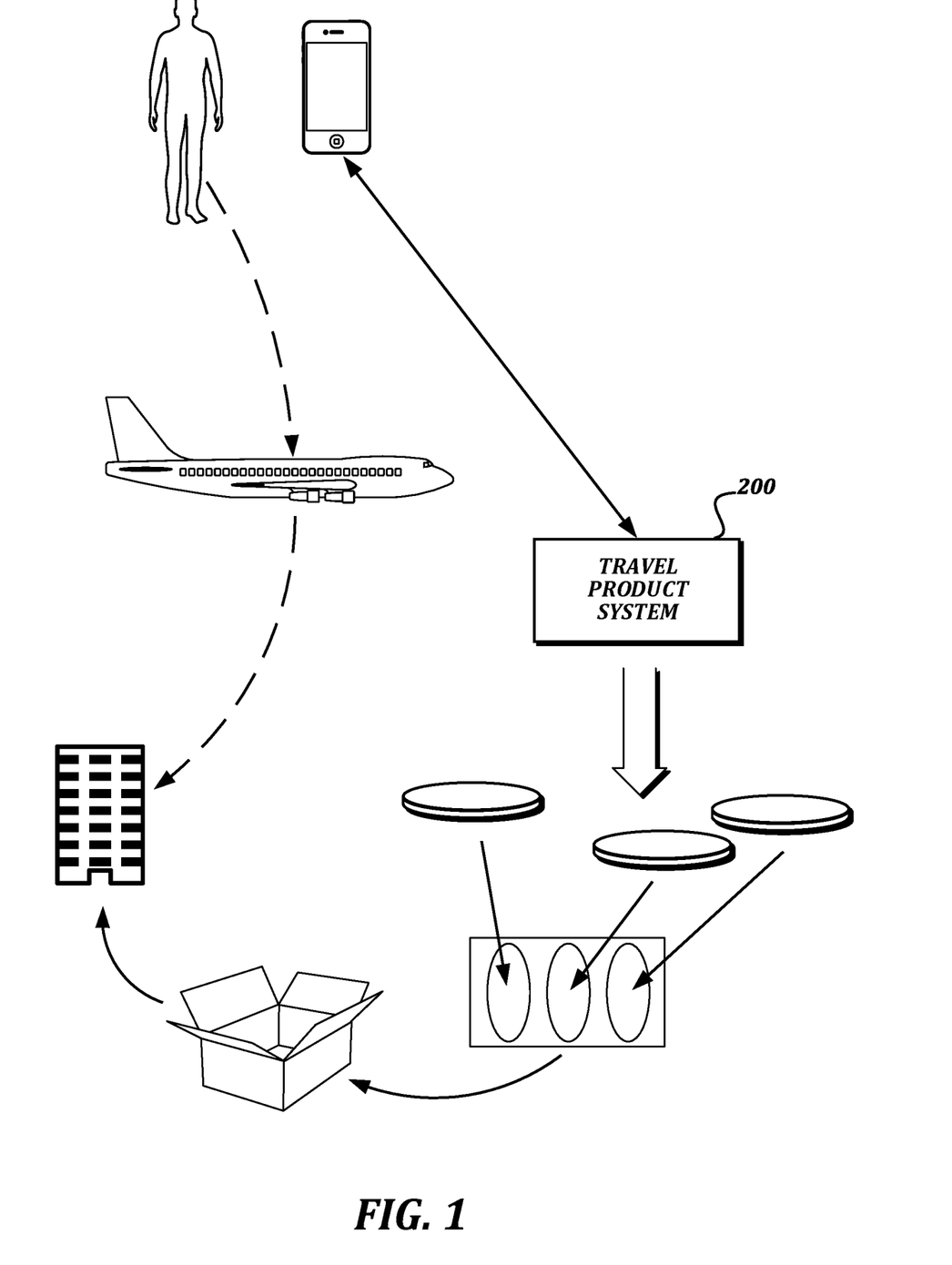
FIG. 1 is a schematic diagram that provides a high-level overview of example functionality of various embodiments of the present disclosure.

FIG. 1 is a schematic diagram that provides a high-level overview of example functionality of various embodiments of the present disclosure that help solve these problems, while also providing technical benefits described in more detail below. As shown, the present disclosure provides a travel product system 200. The travel product system 200 determines user product preferences for personal care products that the user may wish to use at a travel destination. In an embodiment, the system comprises a system for processing personal care products (e.g., personal hygiene products, cosmetics, consumer products, fragrances, hair care products, nail care product, toiletries, shaving products, etc., and the like) for use during travel. Non-limiting examples of personal care products include body oils, body wash, cleansing pads, colognes, conditioners, cotton pads, cotton swabs, deodorants, eye liners, facial cleansers, facial tissues, facial treatments, fragrances, hair clippers, hand soaps, lip balms, lip glosses, lipsticks, lotion, makeup, makeup removers, moisturizers, nail files, perfumes, pomades, razors, shampoos, shaving creams, sunscreens, talcum powder, toilet paper, toothpaste, treatment masks, wet wipes, etc., and the like.

The travel product system 200 may obtain these preferences directly from the user (as illustrated in FIG. 1), or may automatically obtain the preferences from other sources as discussed further below. The travel product system 200 then causes appropriate amounts of the products to be packaged and delivered to the user's travel destination, thus reducing waste and making the products available at the destination without having to carry them while in transit. Though FIG. 1 schematically illustrates airline travel, the travel product system 200 may be used with any type of travel, including but not limited to airline travel, train travel, car travel, or bus travel.

Figure 2:
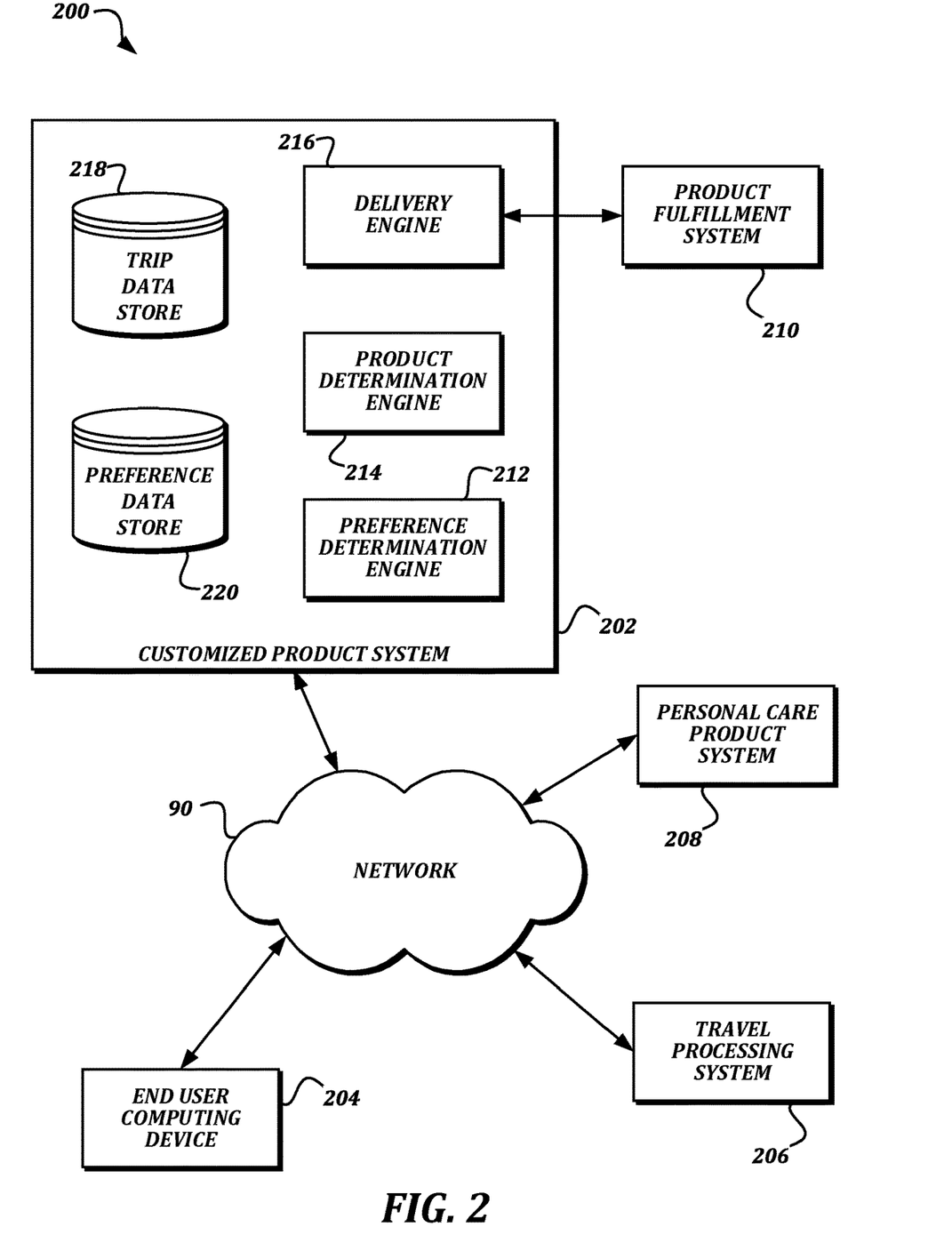
FIG. 2 is a block diagram that illustrates an example embodiment of a system according to various aspects of the present disclosure.

FIG. 2 is a block diagram that illustrates an example embodiment of a system according to various aspects of the present disclosure. The system 200 may be suitable for implementing actions such as determining user product preferences, determining products to deliver to a user in coordination with travel arrangements, and receiving feedback about delivered products. Though some aspects are illustrated and described as relating to personal care products to succinctly describe one embodiment of the present disclosure, in some embodiments, products other than personal care products may be processed by the system 200.

As shown, the system 200 includes an end user computing device 204, a travel processing system 206, a personal care product system 208, a product fulfillment system 210, and a customized product system 202. Each of these components may communicate to each other via a network 90, which may include any suitable communication technology including but not limited to wired technologies such as DSL, Ethernet, fiber optic, USB, and Firewire; wireless technologies such as WiFi, WiMAX, 3G, 4G, LTE, and Bluetooth; and the Internet.

In some embodiments, the end user computing device 204 may be used by a user to interact with other components of the system 200. Typically, the end user computing device 204 is a mobile computing device such as a smartphone or a tablet computing device. However, any other suitable type of computing device capable of communicating via the network 90 and presenting a user interface, including but not limited to a desktop computing device, a laptop computing device, and a smart watch, may be used.

In some embodiments, the travel processing system 206 may be used to search for and book travel arrangements. For example, the travel processing system 206 may receive queries for airline travel over a given range of days (leaving on a departure date and returning on a return date), and may present lists of flights that satisfy the query. The travel processing system 206 may then allow the user to select and purchase flights from the list of flights. As another example, the travel processing system 206 may receive similar queries for lodging in hotels, motels, guest houses, vacation rentals, etc., over a given time period, either in association with or separately from the air travel queries. The travel processing system 206 may then allow the user to select and book a lodging from a list of lodgings that satisfy the query. Non-limiting examples of existing travel processing systems that provide travel arrangement booking and search services (but that have not yet been enhanced to work with the system 200) include Expedia, Hotels.com, Airbnb, Orbitz, and the like. While these examples aggregate travel services provided by multiple providers, travel processing systems associated with single providers, including but not limited to airline web pages and hotel web pages, are also examples of travel processing systems that may be enhanced to serve as a travel processing system 206 in the system 200. In some embodiments, the travel processing system 206 may include one or more computing devices configured to provide the described services.

In some embodiments, the personal care product system 208 is configured to receive selections of personal care products from a user. In some embodiments, the personal care product system 208 may be a traditional retail web service through which the user may browse and purchase personal care products, which is enhanced in order to report personal care product selections to the customized product system 202 as part of a traditional product ordering process. In some embodiments, the personal care product system 208 may be configured to allow the user to browse and select personal care products specifically for use by the customized product system 202. In some embodiments, the personal care product system 208 may be configured to extract selections of personal care products from other indications of user interest in the products, including but not limited to social media interactions with brands, product purchase histories, and web site click through information. In some embodiments, the personal care product system 208 may include one or more computing devices configured to provide the described services.

In some embodiments, the product fulfillment system 210 is configured to receive instructions from the customized product system 202 regarding a selection of products and an amount of each product to be delivered, and is also configured to automatically cause the specified amounts of the products to be packaged and delivered to the user at a specific destination. In some embodiments, the product fulfillment system 210 may include one or more devices for automatically filling appropriately sized containers with bulk products. In some embodiments, the product fulfillment system 210 may include one or more devices for automatically picking pre-filled containers of products and automatically packaging them together with other selected products for delivery. In some embodiments, in addition to these devices, the product fulfillment system 210 may include one or more computing devices configured to provide the described services. Further aspects of the functionality of the product fulfillment system 210 are described below.

In some embodiments, the customized product system 202 is configured to ingest information from the personal care product system 208 and the travel processing system 206, and to use the ingested information to cause selected products to be delivered to the user at their travel destination at an appropriate time. In some embodiments, the customized product system 202 transmits instructions to the product fulfillment system 210 to cause the selected products to be packaged and delivered. The customized product system 202 is illustrated as communicating directly with the product fulfillment system 210, which may occur using any suitable wired or wireless technology, though in some embodiments, communication between the customized product system 202 and the product fulfillment system 210 may occur via the network 90.

As illustrated, the customized product system 202 includes a preference determination engine 212, a product determination engine 214, a delivery engine 216, a preference data store 220, and a trip data store 218. In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

In some embodiments, the preference determination engine 212 receives user product selections from the personal care product system 208 and stores the user selections in the preference data store 220. In some embodiments, the product determination engine 214 receives travel information from the travel processing system 206, and determines appropriate products and amounts for the indicated travel based on the user selections stored in the preference data store 220. The product determination engine 214 may also receive a confirmation or instruction from the user confirming that the selected products should be packaged and delivered. The product determination engine 214 may store the travel information in the trip data store 218 for later reference. In some embodiments, the delivery engine 216 receives indications of the products and amounts from the product determination engine 214, and transmits instructions to the product fulfillment system 210 to complete the packaging and delivery. The delivery engine 216 may store information regarding the packaging and delivery in the trip data store 218. Further details of the functionality of the components of the customized product system 202 are provided below.

Because the functionality of the system 200 is split between the customized product system 202, the product fulfillment system 210, the personal care product system 208, the travel product system 206, and the end user computing device 204, numerous technical benefits are achieved. For example, the use of a separate customized product system 202 allows its functionality to be reused amongst multiple separate personal care product systems 208 and travel processing systems 206. As another example, aggregation of user preference data within the customized product system 202, which may have previously been distributed amongst separate personal care product systems 208 (or not collected at all), allows the customized product system 202 to conduct analysis of these stored preferences in order to improve the delivery of the products in ways that were not possible before. As yet another example, conducting the preference determination, product selection, and delivery within the customized product system 202 instead of at the end user computing device 204 allows the functionality to be provided whether or not the end user computing device 204 is online at the appropriate time for executing the order. It also moves the processing burden to the customized product system 202 (which may be a relatively high-powered and reliable computing system) from the end user computing device 204, thus improving performance and preserving battery life for unrelated functionality provided by the end user computing device 204. In some embodiments, use of the personal care product system 208 allows for storage of product preferences that can be ordered with a single click when travel is booked, without needing to select specific products each time, thus simplifying the travel booking and product ordering interface, particularly on mobile computing devices. In some embodiments, use of the personal care product system 208 allows for predictive product selection and/or suggestion at time of travel booking. In some embodiments, use of the personal care product system 208 allows for improved efficiency of the delivery of the products, based on known travel patterns (e.g., recurring travel, travel at a given time of year, etc.), in that these travel patterns can be used to locally stage goods when and where they are predicted to be ordered.

Figure 3:
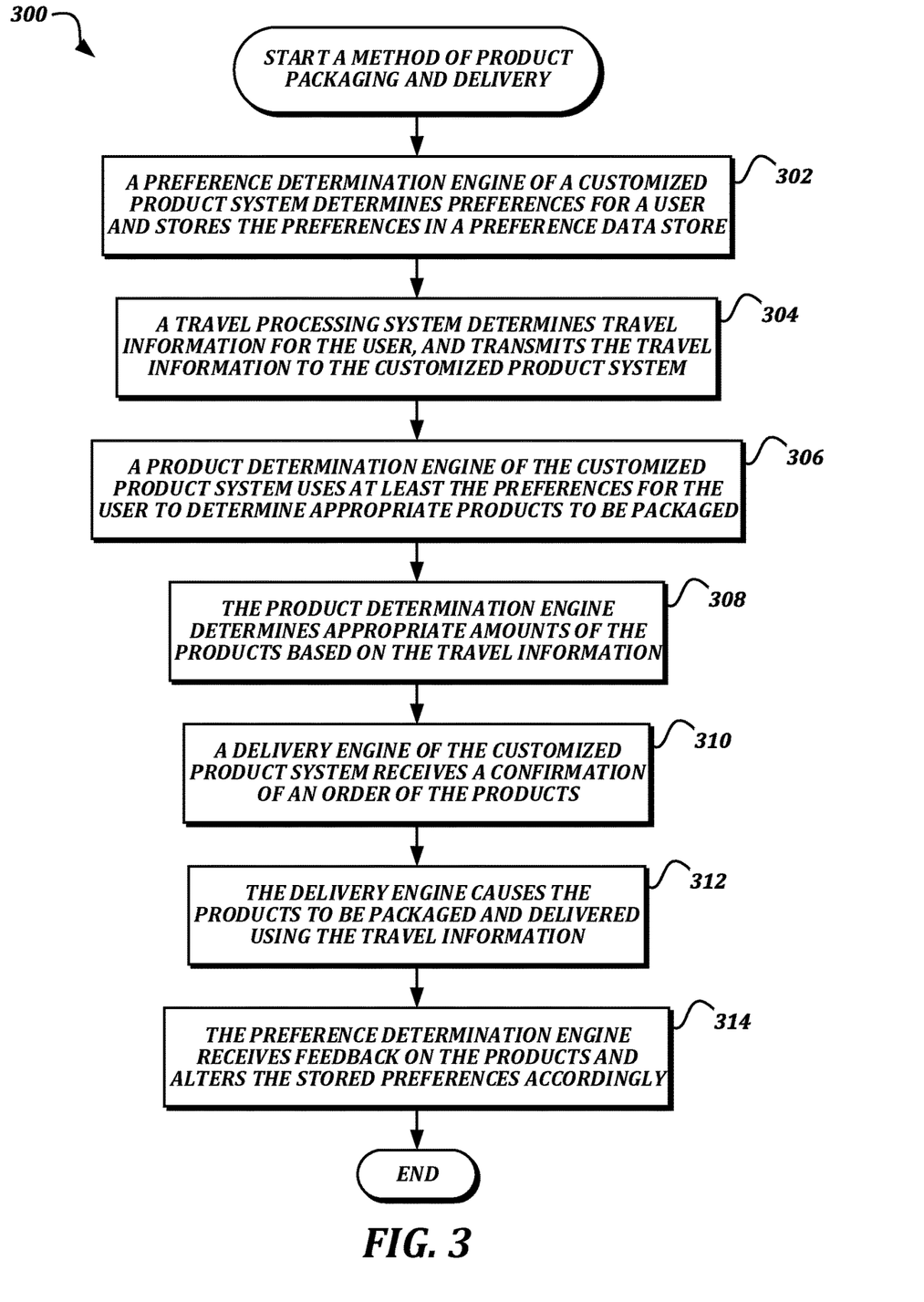
FIG. 3 is a flowchart that illustrates an example embodiment of a method of product packaging and delivery according to various aspects of the present disclosure.

FIG. 3 is a flowchart that illustrates an example embodiment of a method of product packaging and delivery according to various aspects of the present disclosure. Though some embodiments of the method 300 may be used with any type of product, some embodiments of the method 300 are particularly suitable for packaging and delivering personal care products in association with travel. Because personal care products are often in liquid form, the method 300 allows users to avoid having to take such products through security checkpoints at airports. Even for products in solid form, the method 300 is beneficial because it helps users avoid having to carry the products within their increasingly limited carry-on or checked baggage space allotment. Some embodiments of the method 300 also help reduce waste, in that only the amount of product that is expected to be used during the travel is provided, such that excess product is not discarded.

From a start block, the method 300 proceeds to block 302, where a preference determination engine 212 of a customized product system 202 determines preferences for a user and stores the preferences in a preference data store 220. These user preferences may include information including, but not limited to: preferred product brands; preferred types of products (e.g., concealer, foundation, rouge, eyeshadow, eye liner, sunscreen, etc.); and preferred colors, shades, or palettes of particular products. In some embodiments, the preferences may include multiple preferences for multiple looks/purposes. For example, a user may specify a preference for a first product in a first shade for a daytime look, and a preference for a second product in a second shade for a nighttime look.

In some embodiments, the preferences may be determined by the preference determination engine 212 after receiving information from a separate system, some non-limiting examples of which include purchase history information from a personal care product system 208 such as a retail system from which personal care products are purchased, affinity information from a social media system, and click-through information from a tracking system. The preferences can be determined based on this information without further user intervention. In some embodiments, the preferences may be explicitly provided by a user to the personal care product system 208 as preferences for travel, instead of being implicitly determined from purchase histories or other information. One example of a technical benefit of determining preferences based on information collected by the personal care product system 208 is that interfaces provided by the personal care product system 208 may be optimized for different types of end user computing devices 204 already, such as smartphones. Accordingly, no further user interfaces optimized for each type of user interface would need to be generated in order to interact with the customized product system 202.

In some embodiments, the preferences may be entered by the user into a user interface generated by the preference determination engine 212. In some embodiments, instead of being manually entered by the user, the preferences may be automatically determined by the preference determination engine 212 after receiving an image of a group of products captured by the end user computing device 204 (for example, a picture of a medicine cabinet or home shelf on which products are stored), and using computer vision techniques to identify the particular products included in the image to use as the preferred products. Capturing the image may include using a grey card so that the shades of the products can be accurately determined, or using a color reference incorporated into the product packaging to accurately identify product colors regardless of ambient light conditions. Such embodiments provide the technical benefit of enabling the customized product system 202 to collect product preference information without requiring manual input from the user, thus making it easier to provide such functionality for end user computing devices 204 such as smartphones due to the difficulty in entering detailed information therein.

At block 304, a travel processing system 206 determines travel information for the user, and transmits the travel information to the customized product system 202. In some embodiments, the travel information may include itinerary information such as one or more of a destination, a departure date, a departure time, a return date, a return time, an airline, a flight number, a lodging name, a lodging location, a purpose of the trip (e.g., business, personal, etc.), and one or more add-on activities. In some embodiments, the travel information may be collected as part of a booking process for the travel. The automated collection of the travel information again provides the benefit of allowing the information to be collected by the customized product system 202 without requiring entry of the information into the end user computing device 204. In some embodiments, the travel information may be directly entered outside of a booking process (e.g., user enters flight/hotel information into a user interface generated by the customized product system 202.

Next, at block 306, a product determination engine 214 of the customized product system 202 uses at least the preferences for the user to determine appropriate products to be packaged. In some embodiments, the product determination engine 214 may also use the travel information while determining the appropriate products. For example, the product determination engine 214 may use the preferences for the user alone, particularly if only one product or one set of products is stored as a preference such that there is no further choice to make. As another example, the product determination engine 214 may choose to include preferred products for a day look and/or a night look based on a purpose of travel indicated in travel information (a night look may not be necessary for a business trip). As yet another example, the product determination engine 214 may choose different products based on the destination (e.g., choosing a foundation with a stronger SPF if the destination is a sunny climate, or including a moisturizer if the destination has a dry climate, or including a smoothing masque if the destination has a humid climate). In some embodiments, the product determination engine 214 may also use the preferences and/or travel information to determine one or more samples of new products to include in shipment. For example, the preference data store 220 may not have stored a preference for a moisturizer, but the product determination engine 214 may choose to include a sample of moisturizer within the appropriate products based on travel to a dry climate, or may include a sample of a new eyeshadow finish in a color similar to a preferred color (even though the particular finish isn't specified as a preference).

At block 308, the product determination engine 214 determines appropriate amounts of the products based on the travel information. In some embodiments, the product determination engine 214 may determine a number of days indicated by the departure date and return date, and may use the number of days to determine a number of applications of each product. The product determination engine 214 may then use a volume or a weight used in a single application of each product to determine a total volume or weight needed for each product for the number of applications. Depending on the product, the number of applications may be one application per day, or multiple applications per day. In some embodiments, the product determination engine 214 may alter the needed volume or weight based on feedback provided by the user from a previous delivery, as described further below.

Next, at block 310, a delivery engine 216 of the customized product system 202 receives a confirmation of an order of the products. In some embodiments, the confirmation may be provided by the user to the travel processing system 206 as part of the travel booking process. For example, the user may choose or confirm an "order your preferred travel product kit for delivery to your hotel" option as part of the travel booking process at the travel processing system 206, and the travel processing system 206 may transmit the confirmation to the delivery engine 216. In some embodiments, the confirmation of the order of the products may be entered directly by the user into a user interface provided by the delivery engine 216. In some embodiments, the confirmation of the order of the products may be automatically provided to the delivery engine 216 based on a rule or other condition being met, including but not limited to automatically in response to receiving the travel information.

At block 312, the delivery engine 216 causes the products to be packaged and delivered using the travel information. In some embodiments, packaging includes transmitting indications of the products and the amounts to the product fulfillment system 210. In some embodiments, the product fulfillment system 210 may include at least one device for automatically filling appropriately sized containers with bulk liquids or solids based on the indications received from the delivery engine 216. For example, the devices may automatically choose a 1 oz container and place 1 oz of a bulk liquid product into the chosen container to fulfill a request for 1 oz of the liquid product. As another example, the devices may automatically place 5 grams of a bulk powder product into an appropriately sized puck. In some embodiments, the product fulfillment system 210 may include a device for automatically picking pre-filled containers of products from inventory and placing them in a container. For example, if the indication states that 5 oz of a liquid product are needed, the devices may pick a 3 oz pre-filled container and two 1 oz pre-filled containers (or two 3 oz pre-filled containers if more cost effective) of the product to satisfy the indicated selections. In some embodiments, the product fulfillment system 210 may automatically package the filled or picked containers into a larger container such as a palette, a kit, or a box, in order to prepare the products for delivery.

In some embodiments, the product fulfillment system 210 may print labels and transmit shipping requests to a shipping service to cause the completed package to be shipped to the destination. In some embodiments, the labeled package may be picked up by a courier or shipping company, and delivered to a delivery location. The delivery location may be the lodging; may be a locker at a retail facility close to the lodging or along a path to the lodging; may be to a pickup location at the arrival airport or the departure airport, or may be to the booked airplane seat as an amenity. In some embodiments, the product fulfillment system 210 may be provided in an integrated kiosk at an appropriate location for pickup, such that the kiosk both fills or picks the containers and allows the user to pick up the products directly from the kiosk.

The method 300 then proceeds to block 314, where the preference determination engine 212 receives feedback on the products and alters the stored preferences accordingly. The feedback could include any type of information from the user about the products, including but not limited to the amounts of the products that were delivered (e.g., too much, too little); satisfaction with the products; and whether a sample product is desired in the future. In some embodiments, a delivery manifest, a packing list, a receipt, a package of an individual product, or the delivery packaging as a whole may include a link or QR code that directs the user to a user interface that collects the feedback. In some embodiments, the user may receive an email or a notification requesting the feedback. In some embodiments, the preference determination engine 212 may store the feedback in the trip data store 218, or may store the feedback in or use the feedback to alter the stored preferences in the preference data store 220.

The method 300 then proceeds to an end block and terminates.

Figure 4:
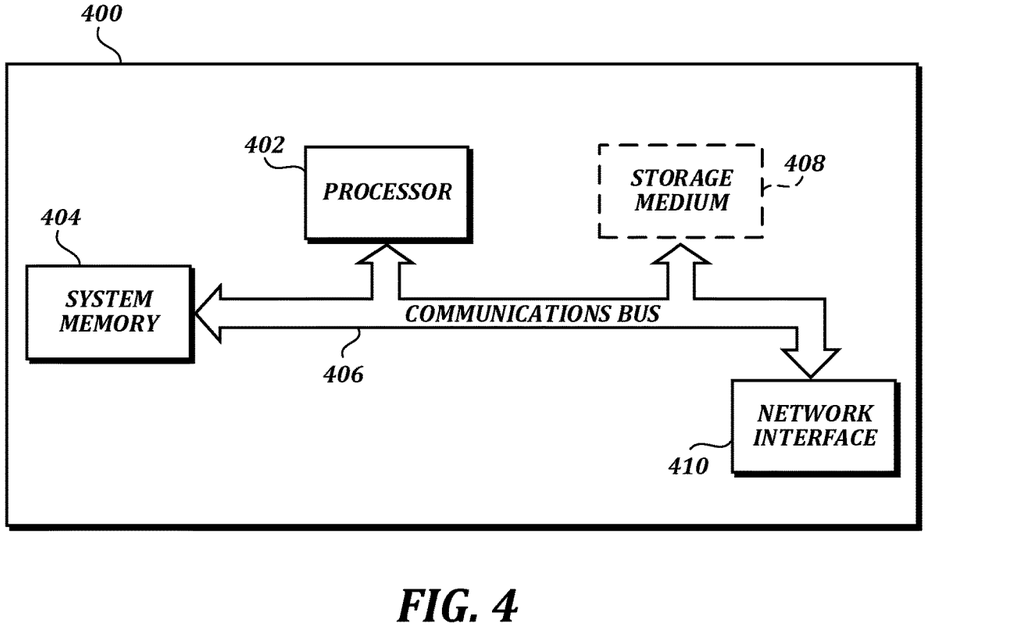
FIG. 4 is a block diagram that illustrates aspects of an exemplary computing device appropriate for use with embodiments of the present disclosure

FIG. 4 is a block diagram that illustrates aspects of an exemplary computing device 400 appropriate for use with embodiments of the present disclosure. While FIG. 4 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 400 may be any one of any number of currently available or yet to be developed devices.

In its most basic configuration, the computing device 400 includes at least one processor 402 and a system memory 404 connected by a communication bus 406. Depending on the exact configuration and type of device, the system memory 404 may be volatile or nonvolatile memory, such as read only memory ("ROM"), random access memory ("RAM"), EEPROM, flash memory, or similar memory technology. Those of ordinary skill in the art and others will recognize that system memory 404 typically stores data and/or program modules that are immediately accessible to and/or currently being operated on by the processor 402. In this regard, the processor 402 may serve as a computational center of the computing device 400 by supporting the execution of instructions.

As further illustrated in FIG. 4, the computing device 400 may include a network interface 410 comprising one or more components for communicating with other devices over a network. Embodiments of the present disclosure may access basic services that utilize the network interface 410 to perform communications using common network protocols. The network interface 410 may also include a wireless network interface configured to communicate via one or more wireless communication protocols, such as WiFi, 2G, 3G, LTE, WiMAX, Bluetooth, and/or the like.

In the exemplary embodiment depicted in FIG. 4, the computing device 400 also includes a storage medium 408. However, services may be accessed using a computing device that does not include means for persisting data to a local storage medium. Therefore, the storage medium 408 depicted in FIG. 4 is represented with a dashed line to indicate that the storage medium 408 is optional. In any event, the storage medium 408 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 404 and storage medium 408 depicted in FIG. 4 are merely examples of computer-readable media. Computer-readable media can be used to store data for use by programs. Accordingly, the terms "electronic spreadsheet," "grid," "table," "cell," "spreadsheet data," "sheet data," "column entry," "row entry," and others used herein describe display formats and logical inter-relationships for information stored on a computer-readable medium of a computing device 400.

Suitable implementations of computing devices that include a processor 402, system memory 404, communication bus 406, storage medium 408, and network interface 410 are known and commercially available. For ease of illustration and because it is not important for an understanding of the claimed subject matter, FIG. 4 does not show some of the typical components of many computing devices. In this regard, the computing device 400 may include input devices, such as a keyboard, keypad, mouse, microphone, touch input device, touch screen, tablet, and/or the like. Such input devices may be coupled to the computing device 400 by wired or wireless connections including RF, infrared, serial, parallel, Bluetooth, USB, or other suitable connections protocols using wireless or physical connections. Similarly, the computing device 400 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

The invention claimed is:

1. A system for packaging and delivering liquid personal care products for use during travel, the system comprising:
a product fulfillment system comprising a packaging device configured to fill containers with configurable amounts of liquid personal care products;
a mobile computing device configured to present:
a first user interface for providing personal care product preference selections; and
a second user interface for booking travel;
a personal care product system comprising one or more computing devices configured to receive personal care product preference selections from the mobile computing device;
a travel processing system comprising one or more computing devices configured to receive and process travel information from the mobile computing device; and
a customized product system comprising one or more computing devices configured to:
receive travel information from the travel processing system;
receive personal care product preference selections from the personal care product system;

determine at least one personal care product to be packaged based at least on the personal care product preference selections;
determine appropriate amounts of the at least one personal care product based on the travel information, including, for each personal care product of the at least one personal care product:
determining a number of uses of the personal care product based on at least a travel duration indicated by the travel information; and
determining a volume of the personal care product to fulfill the number of uses; and
transmit an instruction to the product fulfillment system to fill at least one container with the appropriate amounts of the at least one personal care product;
wherein the product fulfillment system is configured to:
receive the instruction to fill at least one container with the appropriate amounts of the at least one personal care product; and
automatically fill at least one container with the appropriate amounts of the at least one personal care product as indicated by the instruction.

2. The system of claim 1, wherein the one or more computing devices of the customized product system are further configured to cause the filled at least one container to be delivered at a delivery time and a delivery location based on the travel information.

3. The system of claim 2, wherein the delivery location is a lodging, a kiosk, a locker, or an airplane seat.

4. The system of claim 1, wherein determining the at least one personal care product based at least on the personal care product preference selections includes:
basing the determination of the at least one personal care product on at least one of a travel purpose and a travel location indicated by the travel information.

5. The system of claim 1, wherein filling containers with configurable amounts of liquid personal care products includes placing a specified volume of bulk liquid in an appropriate-sized container.

6. The system of claim 1, wherein filling containers with configurable amounts of liquid personal care products includes:
determining a plurality of pre-filled packages of the at least one liquid personal care product to collectively provide the amounts of the at least one personal care product as indicated by the instruction; and
picking and placing the plurality of pre-filled packages of liquid personal care products in a container.

7. A computing device, comprising:
circuitry for receiving travel information from a travel processing system;
circuitry for receiving product preference selections;
circuitry for determining at least one product to be packaged based at least on the product preference selections;
circuitry for determining appropriate amounts of the at least one product based on the travel information; and
circuitry for causing a product fulfillment system to fill at least one container with the appropriate amounts of the at least one product;
wherein determining appropriate amounts of the at least one product based on the travel information includes, for each product of the at least one product:
determining a number of uses of the product based on at least a travel duration indicated by the travel information; and
determining a volume of the product to fulfill the number of uses.

8. The computing device of claim 7, further comprising circuitry for causing the filled at least one container to be delivered at a delivery time and a delivery location based on the travel information.

9. The computing device of claim 8, wherein the delivery location is a lodging, a kiosk, a locker, or an airplane seat.

10. The computing device of claim 7, wherein determining the at least one product based at least on the product preference selections includes:
basing the determination of the at least one product on at least one of a travel purpose and a travel location indicated by the travel information.

11. The computing device of claim 7, wherein receiving the product preference selection comprises at least one of:
receiving an indication of the product preference selection from a retail system separate from the computing device; and
receiving an indication of the product preference selection from a user interface generated by the computing device.

12. A computer-implemented method, comprising:
receiving, by a computing device of a customized product system, travel information from a travel processing system;
receiving, by the computing device, product preference selections;
determining, by the computing device, at least one product to be packaged based at least on the product preference selections;
determining, by the computing device, appropriate amounts of the at least one product based on the travel information, wherein determining appropriate amounts of the at least one product based on the travel information includes, for each product of the at least one product:
determining a number of uses of the product based on at least a travel duration indicated by the travel information; and
determining a volume of the product to fulfill the number of uses; and
transmitting, by the computing device, an instruction that causes a product fulfillment system to fill at least one container with the appropriate amounts of the at least one product.

13. The method of claim 12, further comprising causing, by the computing device, the filled at least one container to be delivered at a delivery time and a delivery location based on the travel information.

14. The method of claim 13, wherein the delivery location is a lodging, a kiosk, a locker, or an airplane seat.

15. The method of claim 12, wherein determining the at least one product based at least on the product preference selections includes:
basing the determination of the at least one product on at least one of a travel purpose and a travel location indicated by the travel information.

16. The method of claim 12, wherein receiving the product preference selection comprises at least one of:
receiving an indication of the product preference selection from a retail system separate from the customized product system; and
receiving an indication of the product preference selection from a user interface generated by the customized product system.

17. The method of claim 16, wherein the indications are submitted via a mobile computing device.

\* \* \* \* \*